United States Patent
Ziemer et al.

(10) Patent No.: US 8,512,192 B2
(45) Date of Patent: Aug. 20, 2013

(54) LUBRICATION DEVICE FOR A PLANETARY GEAR

(75) Inventors: Peter Ziemer, Tettnang (DE); Gert Bauknecht, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 67 days.

(21) Appl. No.: 13/375,801

(22) PCT Filed: May 19, 2010

(86) PCT No.: PCT/EP2010/056904
§ 371 (c)(1),
(2), (4) Date: Dec. 2, 2011

(87) PCT Pub. No.: WO2010/139554
PCT Pub. Date: Dec. 9, 2010

(65) Prior Publication Data
US 2012/0083379 A1   Apr. 5, 2012

(30) Foreign Application Priority Data
Jun. 4, 2009  (DE) .................. 10 2009 026 704

(51) Int. Cl.
*F16H 57/04* (2010.01)

(52) U.S. Cl.
USPC ........................................ 475/159; 184/6.12

(58) Field of Classification Search
USPC ........................................ 475/159; 184/6.12
See application file for complete search history.

(56) References Cited

U.S. PATENT DOCUMENTS

| | | | |
|---|---|---|---|
| 2,503,497 A | 4/1950 | May | |
| 3,318,174 A * | 5/1967 | Clapp et al. | 475/159 |
| 3,606,600 A * | 9/1971 | Pollman | 418/61.1 |
| 4,072,038 A * | 2/1978 | Braun | 72/289 |
| 4,459,869 A * | 7/1984 | Bucksch | 74/467 |
| 4,489,626 A * | 12/1984 | Lemon | 475/159 |
| 4,615,231 A | 10/1986 | Takahashi | |
| 4,901,602 A | 2/1990 | Matoba | |
| 5,429,557 A | 7/1995 | Beim | |
| 5,456,476 A | 10/1995 | Premiski et al. | |
| 5,910,063 A | 6/1999 | Kato | |
| 5,928,100 A | 7/1999 | Ohtake et al. | |
| 7,097,582 B2 | 8/2006 | Bauknecht et al. | |
| 7,568,993 B2 * | 8/2009 | Schulz et al. | 475/347 |
| 7,628,727 B2 * | 12/2009 | Nagai et al. | 475/291 |

(Continued)

FOREIGN PATENT DOCUMENTS

| DE | 43 02 844 C1 | 7/1994 |
|---|---|---|
| DE | 197 36 686 A1 | 3/1998 |

(Continued)

*Primary Examiner* — Tisha Lewis
(74) *Attorney, Agent, or Firm* — Davis & Bujold, PLLC

(57) ABSTRACT

A lubrication device for a planetary transmission with a plurality of planetary gearsets in which a ring gear carrier, which supports a ring gear of a first planetary gearset, is connected to a planetary gear carrier which supports a plurality of planetary gears of an adjacent, second planetary gearset, and in which a lubricant supply for the planetary gears of the second planetary gearset is provided. To provide an inexpensive, simply designed and reliable lubricant supply to the planetary gears of the web carrier coupled to the ring gear of the other planetary gearset, the ring gear is sealed relative to the ring gear carrier of the first planetary gearset and relative to the planetary gear carrier of the second planetary gearset.

13 Claims, 2 Drawing Sheets

(56) References Cited

U.S. PATENT DOCUMENTS

| | | |
|---|---|---|
| 7,824,302 B2 | 11/2010 | Diosi et al. |
| 2008/0269004 A1 | 10/2008 | Diosi et al. |
| 2011/0009229 A1 | 1/2011 | Bauknecht et al. |

FOREIGN PATENT DOCUMENTS

| | | |
|---|---|---|
| DE | 102 21 097 A1 | 11/2003 |
| DE | 10 2005 014 592 A1 | 10/2006 |
| DE | 10 2007 017 138 A1 | 10/2008 |
| DE | 10 2007 023 952 A1 | 11/2008 |
| DE | 10 2008 000 429 A1 | 9/2009 |
| EP | 0 609 659 A1 | 8/1994 |
| EP | 1 504 205 B1 | 2/2006 |
| EP | 1 832 782 A1 | 9/2007 |
| JP | 2001-32913 A | 2/2001 |
| WO | 2005/120877 A1 | 12/2005 |

* cited by examiner

LUBRICATION DEVICE FOR A PLANETARY GEAR

This application is a National Stage completion of PCT/EP2010/056904 filed May 19, 2010, which claims priority from German patent application serial no. 10 2009 026 704.2 filed Jun. 4, 2009.

FIELD OF THE INVENTION

The invention concerns a lubrication device for a planetary transmission with a plurality of planetary gearsets.

BACKGROUND OF THE INVENTION

The bearings and teeth of components in planetary gearsets of automatic transmissions always require reliable lubrication and cooling while in operation, to safeguard their function and ensure their intended useful life. As a rule, the lubricant supplied to them, usually by a hydraulic supply system, branches off by virtue of centrifugal force, via a central hollow shaft of the planetary transmission having transverse openings, in the direction toward the planetary gearsets. In most cases lubrication and cooling oil is supplied to the individual planetary gears via planetary bolts on which the planetary gears are mounted. For this purpose the planetary bolts have a longitudinal duct and one or more radial bores, which pass on the lubrication oil. To direct a sufficient oil flow selectively in the direction of the planetary bolts, additional oil baffles or oil trays are often used, which can for example be attached to planetary carriers, more simply called carriers.

Planetary transmissions with such oil baffles or trays are shown for example in DE 102 21 097 A1, DE 10 2007 017 138 A1 and DE 10 2007 023 952 A1. EP 0 609 659 B1 discloses a comparable arrangement in which an oil retaining disk is arranged on a planetary carrier.

In EP 1 504 205 B1 a front face of a planetary carrier is formed as a carrier plate which, with an adjacent component of a shifting element with no relative speed in relation to the carrier plate, forms a lubricant chamber via which lubrication oil is supplied to the nearby planetary bolts and planetary gears.

As is known, planetary gearsets in a planetary transmission can be coupled with one another in order to simplify the design and reduce the space occupied by and the weight of the transmission as much as possible. Particularly in the case of variable-speed transmissions with a relatively large number of gears, in that connection it is advantageous to connect individual components of different planetary gearsets to one another.

Such a transmission is described in the previously unpublished DE 10 2008 000 429.4 by the present applicant. This multistage transmission comprises four planetary gearsets and features couplings of carrier to carrier and couplings of carrier to ring gear between different planetary gearsets. In particular, individual gearsets in it can be combined or reduced to Simpson or Ravigneaux gearsets, and can be designed as plus gears or minus gears. This provides a total of nine forward gears and one reverse gear, with a particularly large transmission spread.

DE 197 36 686 A1 shows a lubrication device for a planetary transmission with a plurality of planetary gearsets, in which a ring gear carrier of a first planetary gearset is connected to a planetary gear carrier of an adjacent planetary gearset.

Furthermore, in the case of coupled gearsets it is known to suspend a ring gear in a ring gear carrier which, for its part, is in fixed connection with a planetary carrier of another planetary gearset. This in particular improves the acoustic behavior of the transmission. The disadvantage is that via the ring gear suspension leakage losses of lubrication oil can occur and the supply of lubricant can be compromised, so that perfect lubrication of the planetary gears of the planetary carrier connected to the ring gear carrier of the other planetary gearset cannot easily be ensured.

SUMMARY OF THE INVENTION

Against this background the purpose of the present invention is to provide a lubrication device for a planetary transmission with a coupling between a carrier of one planetary gearset and a ring gear of another planetary gearset suspended in a ring gear carrier, which, in an inexpensive and simply designed and constructed manner, enables reliable lubricant supply to the planetary gears of the carrier coupled with the ring gear of the other planetary gearset.

The invention is based on the recognition that in a planetary transmission with coupled gearsets, in which a ring gear is arranged on a ring gear carrier, due to the coupling of the components concerned oil can be supplied to the gearsets via a seal of a carrier-to-ring gear coupling by means of a simple, static sealing element.

Accordingly, the invention starts from a lubrication device for a planetary transmission with a plurality of gearsets, in which a ring gear carrier, which supports a ring gear of a first planetary gearset, is connected to a planetary carrier which carries a plurality of planetary gears of an adjacent, second planetary gearset, and in which a lubricant supply is provided for the planetary gears of the second planetary gearset. To achieve the stated objective the invention provides that the ring gear is sealed relative to the ring gear carrier of the first planetary gearset and relative to the planetary carrier of the second planetary gearset.

The advantageous result of this sealing is that in the area of the coupled planetary gearsets, especially close to the ring gear carrier, flowing oil is selectively supplied to the planetary gears and can therefore be provided for lubrication practically without loss. At least the lubricant supply to the planetary gears of the second planetary gearset preferably passes through planetary bolts on which the planetary gears are mounted, a longitudinal duct being formed in each planetary bolt, with one or more radial bores leading away from it.

In a particularly inexpensive arrangement, a simple, statically sealing seal element is positioned between the ring gear carrier and ring gear of the first planetary gearset and the planetary carrier of the second planetary gearset. Thus, the static seal element seals the carrier on the one hand relative to the ring gear carrier connected to the carrier, and on the other hand relative to the ring gear suspended in the ring gear carrier.

As the seal element, an elastic round seal or O-ring can preferably be used. The seal element can be compressed on both sides between the ring gear and the ring gear carrier radially, or between the ring gear and the planetary carrier axially. It is also possible to fit the seal element or O-ring with three-sided compression between the planetary carrier, the ring gear and the ring gear carrier. Fitting the seal element under compression ensures reliable and durable sealing.

To form a suitable contact surface for the seal element and to lead lubricant in the direction toward the second planetary gearset, it is advantageous to form on the ring gear of the first planetary gearset a projection extending axially in the direction toward the second planetary gearset. Preferably, this projection extends axially as far as the planetary bolts, approximately at the level of the longitudinal axis of the longitudinal ducts.

Advantageously, the ring gear carrier of the one planetary gearset is in permanent fixed connection with the carrier of the other planetary gearset. For example, the connection can be made by riveting or welding. It is also possible to make the carrier and ring gear integrally as one piece, which reduces the number of transmission components and can cut costs.

Moreover, it can be provided that the ring gear is suspended removably in the ring gear carrier, being axially secured in the ring gear by a securing element such as a circlip. This allows subsequent fitting or dismantling of the ring gear, whereby further manufacturing costs and occasionally servicing costs can be saved.

BRIEF DESCRIPTION OF THE DRAWINGS

To clarify the invention, the description of a drawing of two example embodiments is attached. The drawing shows.

DETAILED DESCRIPTION OF THE PREFERRED EMBODIMENTS

Figure 1:
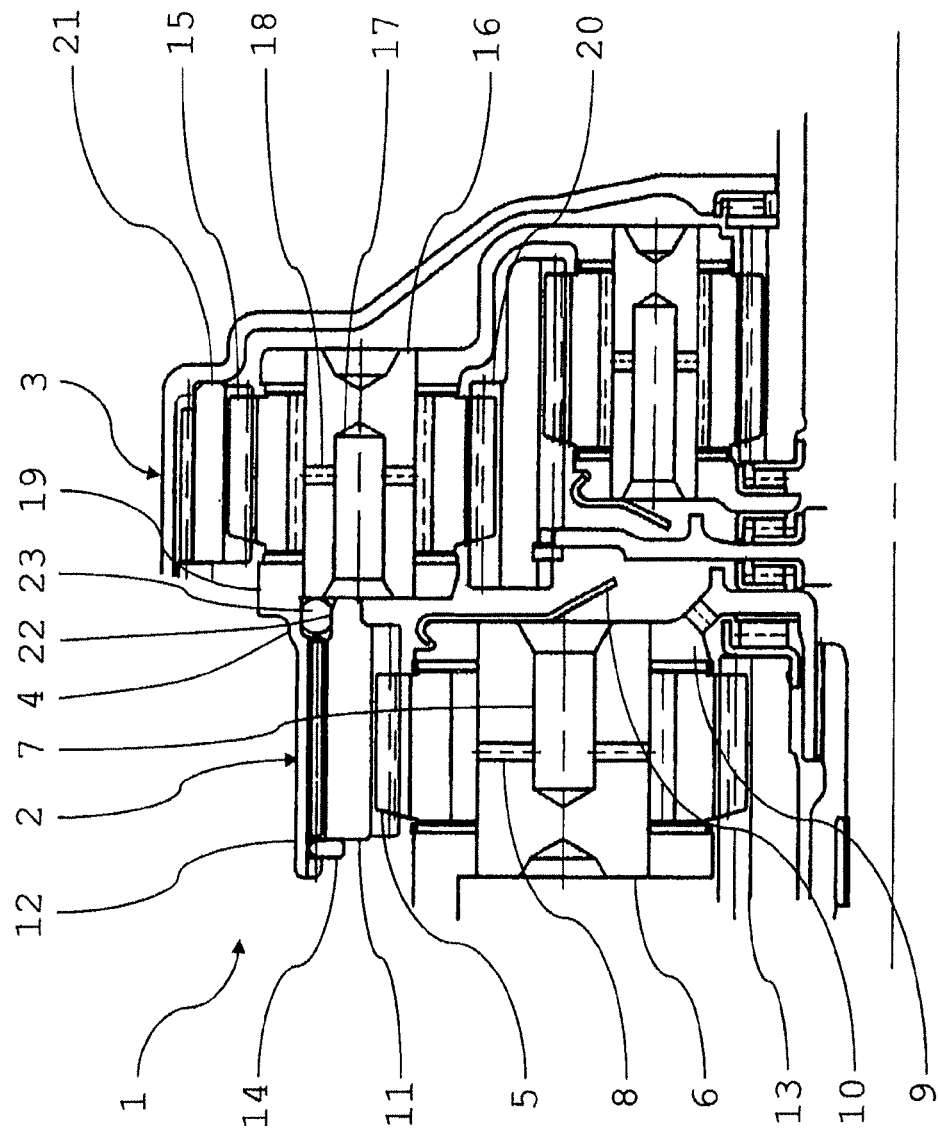
FIG. 1: A longitudinal section through part of a planetary transmission with a sealed carrier-to-ring gear coupling.

Thus, FIG. 1 shows an automatic motor vehicle transmission 1 of planetary design with coupled planetary gearsets. In the view represented three planetary gearsets are indicated, of which a first planetary gearset 2 and a second planetary gearset 3 are relevant to the invention and will be described in more detail below.

The first planetary gearset 2 has a plurality of structurally identical planetary gears 5, one of which is shown in the figure. The planetary gears 5 move around a radially inner sun gear 13, within an outer ring gear 11. The ring gear 11 is inserted into a ring gear carrier 12 and secured axially by a circlip 14. The planetary gears 5 are mounted to rotate on planetary bolts 6. The planetary bolts 6 each have a longitudinal duct 7 connected to radial bores 8 in the planetary bolt 6.

The planetary gears 5 are guided by a planetary carrier or carrier 9, which supports the planetary bolts 6. On the face of the carrier 9 open to the longitudinal ducts 7 is attached an angled oil collector baffle 10. The oil baffle 10 diverts part of the lubrication oil flowing under centrifugal force radially from the inside outward, which is provided by a central hydraulic supply system (not shown), into the longitudinal ducts 7 of the planetary bolts 6. Via the radial bores 8 in the planetary bolts 6 lubrication and cooling oil is correspondingly fed to the gearset 2 and its planetary gears 5.

Another fraction of the lubrication oil continues flowing radially outward to the area of the second planetary gearset 3, which is arranged on a larger diameter. Again, this second planetary gearset 3 has a plurality of planetary gears 15, which are mounted on planetary bolts 16 with a longitudinal duct 17 and radial bores 18 and are guided by a carrier 19. The planetary gears 15 also mesh with a sun gear 20 and a ring gear 21.

At its end the carrier 19 of the second planetary gearset 3 is connected integrally with the ring gear carrier 12 of the first planetary gearset 2 and forms with it a carrier-to-ring gear coupling. Between an axial projection 22 formed on the ring gear 11 of the first planetary gearset 2 and a connecting section 4 of the ring gear carrier 12 and carrier 19, according to the invention a seal element 23 in the form of an O-ring is positioned radially above the longitudinal ducts 17 of the planetary bolts 16 of the second planetary gearset 3. This O-ring 23 is fitted radially compressed between the ring gear 11 and the ring gear carrier 12.

In the area of the second planetary gearset 3 flowing lubrication and cooling oil is deflected at the axial projection 22 of the ring gear 11 toward the longitudinal ducts 17 of the planetary gears 15 of the second planetary gearset 3. Thus, the O-ring 23 prevents any loss of oil toward the ring gear carrier 12 and therefore functions as a lubricant feeder or gearset oil feeder to the planetary gears 15 of the second planetary gearset 3 coupled with the first planetary gearset 2.

Figure 2:
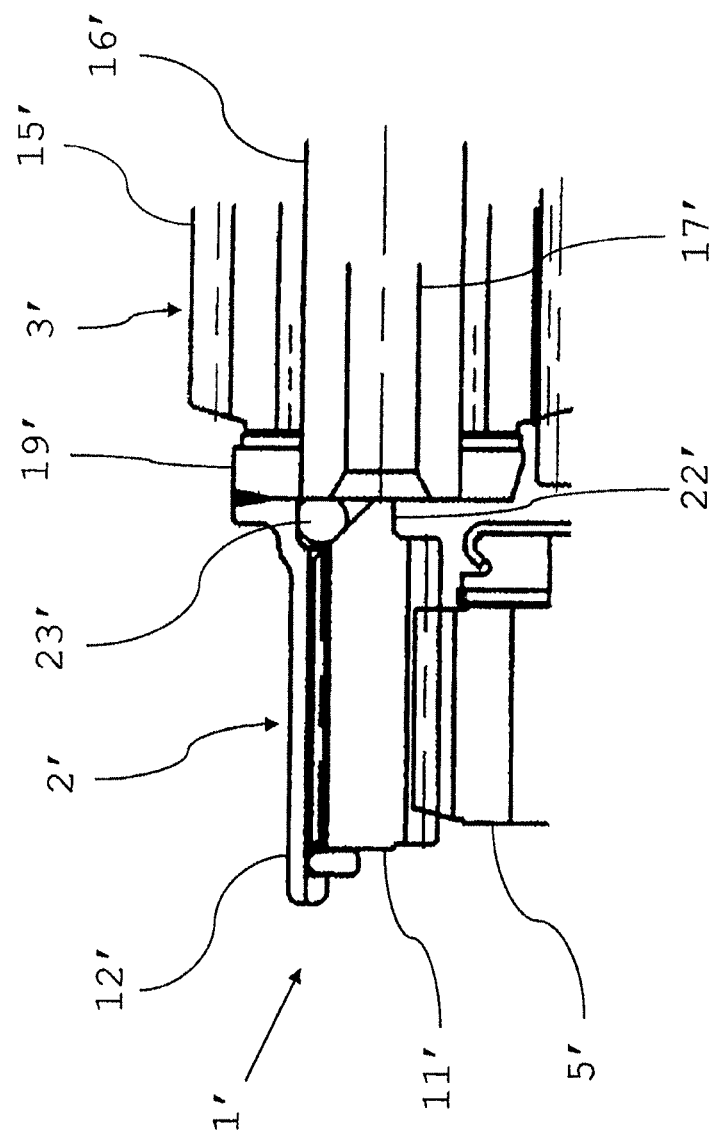
FIG. 2: On a larger scale, a longitudinal section through part of a second embodiment of a planetary transmission with a sealed carrier-to-ring gear coupling.

FIG. 2 shows a second embodiment of an automatic transmission 1' with two coupled planetary gearsets 2' and 3'. The transmission arrangement corresponds largely to that shown in FIG. 1. Accordingly, the representation is limited to a smaller, relevant area of the automatic transmission 1'. Here, a ring gear 11' is suspended in a ring gear carrier 12' of the first planetary gearset 2', around which associated planetary gears 5' rotate. To form a carrier-to-ring gear coupling, at its end the ring gear carrier 12' is connected fixed by a weld seam to a carrier 19' of the second planetary gearset 3'. The planetary gears 15' of the second planetary gearset 3' are mounted on planetary bolts 16' with a longitudinal duct 17' and one or more radial bores (not shown) for feeding through the lubricant.

On the ring gear 11' is formed a chamfered axial projection 22' extending toward the second planetary gearset 3'. An O-ring 23' is fitted as a seal element, compressed between the ring gear 11' or its axial projection 22', the ring gear carrier 12' and the carrier 19', so that once more, with radial sealing, gearset oil is fed to the planetary gears 15' of the second gearset 3'.

INDEXES 1, 1' Automatic transmission
2, 2' Planetary gearset
3, 3' Planetary gearset
4 Connecting section
5, 5' Planetary gearwheel
6 Planetary bolt
7 Longitudinal duct
8 Radial bore
9 Planetary carrier, carrier
10 Oil tray
11, 11' Ring gear
12, 12' Ring gear carrier
13 Sun gear
14 Securing element, circlip
15, 15' Planetary gearwheel
16, 16' Planetary bolt
17, 17' Longitudinal duct
18 Radial bore
19, 19' Planetary carrier, carrier
20 Sun gear
21 Ring gear
22, 22' Projection
23, 23' Sealing element, O-ring

The invention claimed is:
1. A lubrication device for a planetary transmission comprising a plurality of planetary gearsets (2, 3; 2', 3') in which a ring gear carrier (12, 12'), which supports a ring gear (11, 11') of a first planetary gearset (2, 2'), being connected to a planetary gear carrier (19, 19') which supports a plurality of planetary gears (15, 15') of an adjacent, second planetary gearset (3, 3'), a lubricant supply path being provided for the planetary gears (15, 15') of the second planetary gearset (3, 3'), and the ring gear (11, 11') of the first planetary gearset (2, 2') being sealed relative to the ring gear carrier (12, 12') of the first planetary gearset (2, 2') and relative to the planetary gear carrier (19, 19') of the second planetary gearset (3, 3') by a sealing element that is located between the ring gear (11, 11') and the ring gear carrier (12, 12') of the first planetary gearset (2, 2') along a radial axis.

2. The lubrication device according to claim 1, wherein the sealing element is a statically sealing seal element (23, 23') and is positioned along the radial axis which passes through the ring gear carrier (12, 12') and the ring gear (11, 11') of the first planetary gearset (2, 2') and the sealing element is axially adjacent the planetary gear carrier (19, 19') of the second planetary gearset (3, 3').

3. The lubrication device according to claim 1, wherein the lubricant supply to the planetary gears (15, 15') of the second planetary gearset (3, 3') flows via planetary bolts (16, 16') on which the planetary gears (15, 15') are mounted, and each planetary bolt (16, 16') has a longitudinal duct (17, 17') from which at least one radial bore (18) extends from.

4. The lubrication device according to claim 1, wherein the seal element (23, 23') is made from either an elastomer or an elastomeric material.

5. A lubrication device for a planetary transmission comprising a plurality of planetary gearsets (2, 3; 2', 3') in which a ring gear carrier (12, 12'), which supports a ring gear (11, 11') of a first planetary gearset (2, 2'), being connected to a planetary gear carrier (19, 19') which supports a plurality of planetary gears (15, 15') of an adjacent, second planetary gearset (3, 3'), a lubricant supply path being provided for the planetary gears (15, 15') of the second planetary gearset (3, 3'), the ring gear (11, 11') of the first planetary gearset (2, 2') being sealed relative to the ring gear carrier (12, 12') of the first planetary gearset (2, 2') and relative to the planetary gear carrier (19, 19') of the second planetary gearset (3, 3') by a seal element the seal element (23, 23') is made from either an elastomer or an elastomeric material, and the seal element (23, 23') is an O-ring.

6. The lubrication device according to claim 4, wherein the seal element (23) is radially compressed between the ring gear (11) and the ring gear carrier (12).

7. The lubrication device according to claim 1, wherein the seal element is axially compressed between the ring gear and the planetary gear carrier.

8. The lubrication device according to claim 1, wherein the seal element (23') is compressed between the planetary gear carrier (19'), the ring gear (11') and the ring gear carrier (12).

9. A lubrication device for a planetary transmission comprising a plurality of planetary gearsets (2, 3; 2', 3') in which a ring gear carrier (12, 12'), which supports a ring gear (11, 11') of a first planetary gearset (2, 2'), being connected to a planetary gear carrier (19, 19') which supports a plurality of planetary gears (15, 15') of an adjacent, second planetary gearset (3, 3'), a lubricant supply path being provided for the planetary gears (15, 15') of the second planetary gearset (3, 3'), and the ring gear (11, 11') of the first planetary gearset (2, 2') being sealed relative to the ring gear carrier (12, 12") of the first planetary gearset (2, 2') and relative to the planetary gear carrier (19, 19') of the second planetary gearset (3, 3'), and the ring gear (11, 11') is either suspended in, or removably inserted into the ring gear carrier (12, 12').

10. The lubrication device according to claim 9, wherein the ring gear (11, 11') is secured axially in the ring gear carrier (12, 12') by a securing element (14).

11. The lubrication device according to claim 1, wherein the ring gear carrier (12') is one of permanently riveted or welded to the planetary gear carrier (19').

12. The lubrication device according to claim 1, wherein the ring gear carrier (12) is formed integrally with the planetary gear carrier (19).

13. The lubrication device according to claim 1, wherein a projection (22, 22') is formed on the ring gear (11, 11') of the first planetary gearset (2, 2') which extends axially toward the second planetary gearset (3, 3') to form a contact surface for the seal element (23, 23') and for passing the lubricant to the second planetary gearset (3, 3').

\* \* \* \* \*